UNITED STATES PATENT OFFICE.

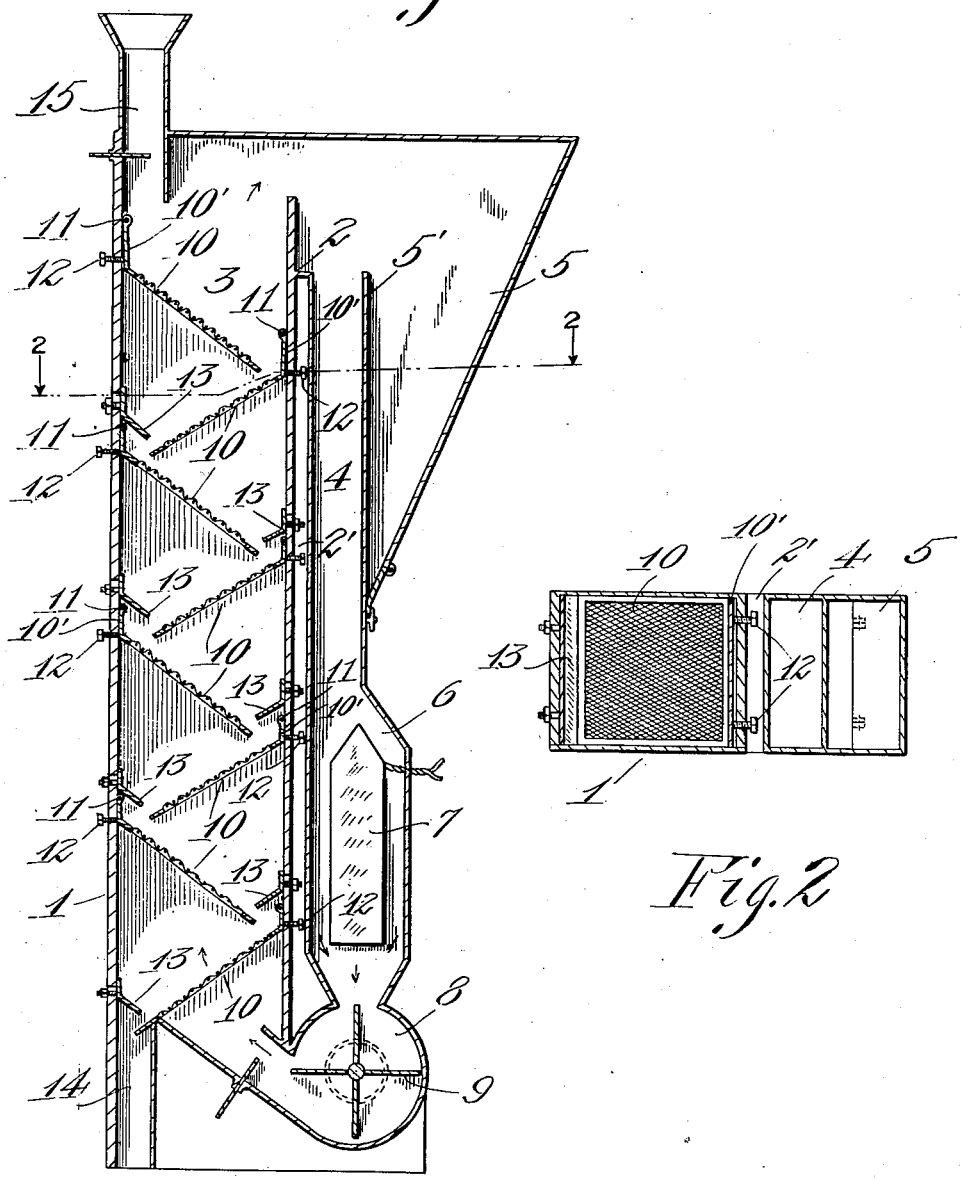

WILLIAM WILSON, OF SEATTLE, WASHINGTON, ASSIGNOR OF ONE-HALF TO THOMAS G. H. GRANT, OF WENATCHEE, WASHINGTON.

GRAIN-DRIER.

No. 884,696.　　　Specification of Letters Patent.　　　Patented April 14, 1908.

Application filed December 24, 1907. Serial No. 407,979.

*To all whom it may concern:*

Be it known that I, WILLIAM WILSON, a citizen of the United States of America, and a resident of the city of Seattle, in the county of King and State of Washington, have invented certain new and useful Improvements in Grain-Driers, of which the following is a specification.

My invention relates to improvements in apparatus of the above character and aims primarily to provide a comparatively simple construction wherein grain can be dried in an efficient manner.

With the above and other objects in view, to be referred to as the description progresses, the invention resides in the construction and arrangement of parts hereinafter described and defined in the appended claims.

Referring now to the accompanying drawing, in which like numerals of reference indicate like parts throughout: Figure 1 is a vertical sectional view of my apparatus, and Fig. 2 is a section taken on line 2—2 thereof.

Referring now to the drawing by numerals of reference, 1 indicates the casing which may be of any desired construction, and 2, a vertical partition arranged therein to provide the shaft 3 and conduit 4, said partition terminating below the top wall of the casing to provide an outlet for the dust and air, as will be more fully described hereinafter.

Reference numeral 5 indicates a dust chamber, the inner wall 5' of which, also forms one wall of conduit 4. Conduit 4 communicates with a chamber 6 in which the air is heated by any suitable means. I prefer, however, to use an electric heater, as 7, the upper end portion of which is pointed, so as to deflect the air to both sides of the heater, as will be readily understood. A conduit 8 leads from chamber 6 to the lower end of shaft 3, and in this conduit I arrange a fan 9, which in operation draws the heated air from chamber 6 and forces it upwardly into shaft 3. In shaft 3, is arranged a plurality of inclined aprons 10, the alternate aprons being reversely inclined, as illustrated, and having their adjacent ends suitably spaced apart to provide passages for the grain. Aprons 10 comprises foraminous body portions which are secured to frames of open formation (see Fig. 2), said frames having end extensions 10' pivoted as at 11.

Reference numeral 12 indicates suitable adjusting screws having threaded engagement in the walls of shaft 3 and having their inner ends bearing against extensions 10' of aprons 10, whereby said aprons can be adjusted, as desired to vary their inclination.

Reference numeral 13 indicates baffle plates which are connected to the opposite walls of shaft 3 for vertical adjustment. These baffle plates are preferably arranged slightly above the lower ends of aprons 10 so as to baffle the ascending hot air and cause it to be deflected onto the grain from above as the grain falls from one apron onto another thereby preventing a direct and rapid rise of the air. The lowest apron extends over the discharge mouth of conduit 8 to the grain discharge 14.

In operation, grain or other granular matter to be dried being fed into shaft 3, at 15, travels over aprons 10 by gravity while the air, heated by heater 7, is circulated upwardly through said shaft. The air upon reaching the upper portion of shaft 3 is drawn by fan 9 back through conduit 4 to chamber 6. Dust forced from shaft 3 will be caught in chamber 5.

Partition 2 is of novel construction, the same being formed of spaced walls to provide a space 2' extending from one side of casing 1 to the other and being open at the side of said casing, whereby a wrench or the like can be inserted to operate the adjusting screws 12 (see Fig. 2).

Having thus fully described my invention, what I claim as new and desire to secure by Letters Patent of the United States, is:

1. A grain drier comprising a casing provided with a shaft in which is arranged a plurality of inclined aprons to provide a tortuous passage for the grain, said casing being provided with a dust chamber open to communication with said shaft, a heating means, a conduit through which air from the upper portion of said shaft travels to said heating means, and a fan arranged to draw air heated by said heating means and force the same into the lower portion of said shaft.

2. A grain drier comprising a casing provided with a shaft and a conduit, a partition separating said shaft and conduit, said partition being hollow and being open at each side, inclined aprons pivoted to said partition and to the opposite wall of said shaft, means for adjusting said aprons to vary their inclination, the means for adjusting those aprons pivoted to said partition projecting into said partition, and means for forcing heated air into said shaft.

Signed at Seattle, Washington this 16th day of December 1907.

WILLIAM WILSON.

Witnesses:
   D. B. TREFETHEN,
   LOREN GRIMSTEAD.